J. W. HARRIS.
Vehicle-Wheel.
No. 206,442.　　　Patented July 30, 1878.
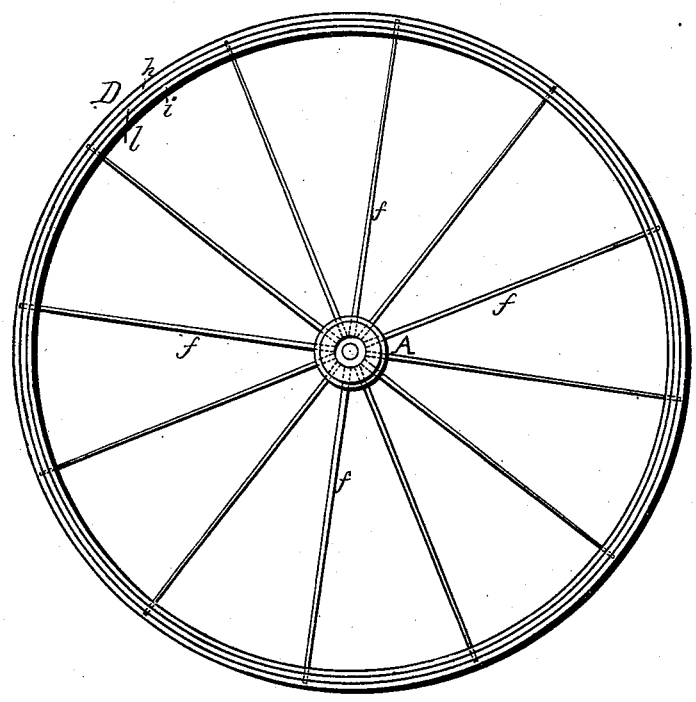
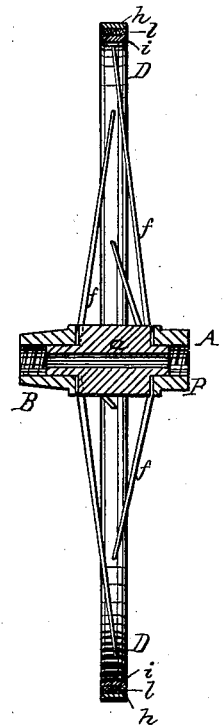
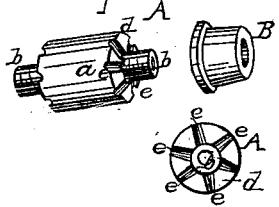
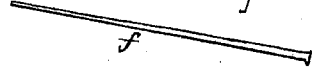
Witnesses:
Chas. O. Gill
Wilbur F. Nash
Inventor:
Joshua W. Harris.
By his Attys.
Cox and Cox

UNITED STATES PATENT OFFICE.

JOSHUA W. HARRIS, OF WAYNESBOROUGH, ASSIGNOR OF ONE-HALF HIS RIGHT TO JAMES W. WEADE, OF AUGUSTA COUNTY, VIRGINIA.

IMPROVEMENT IN VEHICLE-WHEELS.

Specification forming part of Letters Patent No. 206,442, dated July 30, 1878; application filed March 11, 1878.

*To all whom it may concern:*

Be it known that I, JOSHUA W. HARRIS, of Waynesborough, in the county of Augusta and State of Virginia, have invented a new and useful Improvement in Wheels, of which the following is a specification, reference being had to the accompanying drawings.

The invention relates to an improvement in wheels for vehicles, as hereinafter set forth.

The object of the invention is to supply a durable wheel of novel construction, and specially adapted to carriages and other light vehicles.

In the accompanying drawings, Figure 1 is a plan view, and Fig. 2 a central vertical longitudinal section, of a device embodying the elements of the invention; and Figs. 3 and 4, detached views of certain parts of the invention designated by letter.

A represents the hub, which, in the present instance, is cast with the annular collar $a$ at its center, and with a reduced end, $b$, on each side thereof, the ends being of lesser dimensions than the collar, in order to form the shoulders $d$, which, at suitable intervals, are supplied with the grooves $e$, radiating from the center of the hub, and of proper size to snugly receive the lower ends of the spokes $f$. The grooves $e$ are so arranged that the spokes $f$ on one side of the collar $a$ will appear exactly between those on the other side, thus producing an evenly-braced and well-proportioned wheel.

The ends $b$ of the hub are furnished with a suitable male screw-thread, which meshes with the thread cut in the interior surface of the bands B, which are screwed firmly against the shoulders $d$, and thereby securely retain the lower ends of the spokes $f$ in place, said lower ends being, if desired, previously upset for the purpose of strengthening them, and to throw the lighter portions of the spokes next to the rim of the wheel.

The bands B, usually termed the "point" and "mud" bands, are of greater length than the ends $b$. Thus their ends project beyond the ends of the hub, and serve to protect, on one side, the tap or nut, and on the other the shoulder on the spindle.

From the hub A the spokes $f$ radiate outward, and have their ends secured in the rim D, which is composed of a metallic tire, $h$, a metallic inner band, $i$, and a strip of wood, $l$, which is secured between the tire and band.

In the present instance, the outer ends of the spokes $f$ are screwed through the inner metal band $i$ and wood $l$, and enter countersinks previously formed in the tire $h$. Thus it is obvious that when the spokes $f$ are forced to place they will secure the tire $h$ and bands $i$ $l$ in a fixed position, and that when the bands B are screwed up against the collar $a$ the spokes will be immovably retained in place.

In the operation of upsetting or swelling the inner portions of the spokes $f$ their extreme ends are slightly flanged, which flanges, when the tapered ends of the spokes are placed in the correspondingly-shaped grooves $e$, and the band B screwed against them, assist in preventing the withdrawal or movement of the said spokes.

What I claim as my invention, and desire to secure by Letters Patent, is—

1. In a wheel, the metal spokes $f$, having their inner ends upset and secured in the tapered grooves $e$ by the bands B, and their outer ends forced into countersinks or apertures in the tire of the wheel, substantially as specified.

2. As a means for securing the rim D in place, the spokes $f$, the outer ends of which pass through the band $i$ and filling $l$, and enter countersinks in the tire $h$, substantially as specified.

In testimony that I claim the foregoing improvement in wheels, as above described, I have hereunto set my hand this 4th day of March, 1878.

JOSHUA WASHINGTON HARRIS.

Witnesses:
    JONATHAN KOINER,
    JAMES W. WEADE.